United States Patent
Bala et al.

(10) Patent No.: US 11,416,713 B1
(45) Date of Patent: *Aug. 16, 2022

(54) DISTRIBUTED PREDICTIVE ANALYTICS DATA SET

(71) Applicant: Bottomline Technologies (de) Inc., Portsmouth, NH (US)

(72) Inventors: Jerzy Bala, Potomac Falls, VA (US); Paul Green, Londonderry, NH (US)

(73) Assignee: Bottomline Technologies, Inc., Portsmouth, NH (US)

( * ) Notice: Subject to any disclaimer, the term of this patent is extended or adjusted under 35 U.S.C. 154(b) by 821 days.

This patent is subject to a terminal disclaimer.

(21) Appl. No.: 16/355,985

(22) Filed: Mar. 18, 2019

(51) Int. Cl.
G06K 9/62 (2022.01)
G06N 20/00 (2019.01)

(52) U.S. Cl.
CPC .......... G06K 9/626 (2013.01); G06K 9/6253 (2013.01); G06K 9/6257 (2013.01); G06N 20/00 (2019.01)

(58) Field of Classification Search
CPC .... G06K 9/626; G06K 9/6253; G06K 9/6257; G06N 20/00
See application file for complete search history.

(56) References Cited

U.S. PATENT DOCUMENTS

| | | |
|---|---|---|
| 4,575,793 A | 3/1986 | Morel et al. |
| 5,228,122 A | 7/1993 | Cahn et al. |
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |

(Continued)

FOREIGN PATENT DOCUMENTS

| | | |
|---|---|---|
| EP | 1211865 A2 | 6/2002 |
| EP | 1706960 A1 | 10/2006 |

(Continued)

OTHER PUBLICATIONS

Kim, Jinkyu etal, Collaborative Analytics for Data Silos, Jun. 2016, IEEE Xplore, pp. 743-754 (Year: 2016).*

(Continued)

*Primary Examiner* — Lewis G West
(74) *Attorney, Agent, or Firm* — Richard A. Baker, Jr.

(57) ABSTRACT

A novel distributed method for machine learning is described, where the algorithm operates on a plurality of data silos, such that the privacy of the data in each silo is maintained. In some embodiments, the attributes of the data and the features themselves are kept private within the data silos. The method includes a distributed learning algorithm whereby a plurality of data spaces are co-populated with artificial, evenly distributed data, and then the data spaces are carved into smaller portions whereupon the number of real and artificial data points are compared. Through an iterative process, clusters having less than evenly distributed real data are discarded. A plurality of final quality control measurements are used to merge clusters that are too similar to be meaningful. These distributed quality control measures are then combined from each of the data silos to derive an overall quality control metric.

20 Claims, 14 Drawing Sheets

(56) References Cited

U.S. PATENT DOCUMENTS

| | | | |
|---|---|---|---|
| 5,845,369 A | 12/1998 | Dunchock | |
| 5,912,669 A | 6/1999 | Hsia | |
| 5,961,592 A | 10/1999 | Hsia | |
| 5,970,482 A | 10/1999 | Pham et al. | |
| 6,044,401 A | 3/2000 | Harvey | |
| 6,192,411 B1 | 2/2001 | Chan et al. | |
| 6,205,416 B1 | 3/2001 | Butts et al. | |
| 6,256,737 B1 | 7/2001 | Bianco et al. | |
| 6,523,016 B1 | 2/2003 | Michalski | |
| 6,651,099 B1 | 11/2003 | Dietz et al. | |
| 6,675,164 B2 | 1/2004 | Kamath et al. | |
| 6,687,693 B2 * | 2/2004 | Cereghini | G06F 16/2465 707/602 |
| 6,708,163 B1 | 3/2004 | Kargupta et al. | |
| 6,801,190 B1 | 10/2004 | Robinson et al. | |
| 6,845,369 B1 | 1/2005 | Rodenburg | |
| 7,092,941 B1 | 8/2006 | Campos | |
| 7,174,462 B2 | 2/2007 | Pering et al. | |
| 7,308,436 B2 | 12/2007 | Bala et al. | |
| 7,415,509 B1 | 8/2008 | Kaltenmark et al. | |
| 7,730,521 B1 | 6/2010 | Thesayi et al. | |
| 7,822,598 B2 | 10/2010 | Carus et al. | |
| 7,831,703 B2 | 11/2010 | Krelbaum et al. | |
| 7,860,783 B2 | 12/2010 | Yang et al. | |
| 7,992,202 B2 | 8/2011 | Won et al. | |
| 8,229,875 B2 | 7/2012 | Roychowdhury | |
| 8,229,876 B2 | 7/2012 | Roychowdhury | |
| 8,392,975 B1 | 3/2013 | Raghunath | |
| 8,429,745 B1 | 4/2013 | Casaburi et al. | |
| 8,433,791 B2 | 4/2013 | Krelbaum et al. | |
| 8,515,862 B2 | 8/2013 | Zhang et al. | |
| 8,638,939 B1 | 1/2014 | Casey et al. | |
| 8,650,624 B2 | 2/2014 | Griffin et al. | |
| 8,776,213 B2 | 7/2014 | McLaughlin et al. | |
| 8,844,059 B1 | 9/2014 | Manmohan | |
| 8,881,005 B2 | 11/2014 | Al Badrashiny et al. | |
| 9,015,036 B2 | 4/2015 | Karov et al. | |
| 9,489,627 B2 * | 11/2016 | Bala | G16B 40/30 |
| 9,529,678 B2 | 12/2016 | Krelbaum et al. | |
| 9,537,848 B2 | 1/2017 | McLaughlin et al. | |
| 9,607,103 B2 | 3/2017 | Anderson | |
| 9,667,609 B2 | 5/2017 | McLaughlin et al. | |
| 9,691,085 B2 | 6/2017 | Scheidelman | |
| 10,037,533 B2 | 7/2018 | Caldera | |
| 10,152,680 B1 | 12/2018 | Myrick et al. | |
| 10,235,356 B2 | 3/2019 | Amend et al. | |
| 10,242,258 B2 | 3/2019 | Guo et al. | |
| 10,320,800 B2 | 6/2019 | Guo et al. | |
| 10,402,817 B1 | 9/2019 | Benkreira et al. | |
| 10,414,197 B2 | 9/2019 | Jesurum | |
| 10,440,015 B1 | 10/2019 | Pham et al. | |
| 10,467,631 B2 | 11/2019 | Dhurandhar et al. | |
| 10,510,083 B1 | 12/2019 | Vukich et al. | |
| 10,511,605 B2 | 12/2019 | Ramberg et al. | |
| 10,523,681 B1 | 12/2019 | Bulgakov et al. | |
| 10,552,837 B2 | 2/2020 | Jia et al. | |
| 10,552,841 B1 | 2/2020 | Dixit | |
| 10,607,008 B2 | 3/2020 | Byrne et al. | |
| 10,607,228 B1 * | 3/2020 | Gai | G06Q 20/4016 |
| 10,621,587 B2 | 4/2020 | Binns et al. | |
| 10,699,075 B2 | 6/2020 | Amend et al. | |
| 10,824,809 B2 | 11/2020 | Kutsch et al. | |
| 11,003,999 B1 * | 5/2021 | Gil | G06Q 40/025 |
| 11,042,555 B1 | 6/2021 | Kane et al. | |
| 11,194,846 B2 * | 12/2021 | Stenneth | G01C 21/32 |
| 11,321,330 B1 * | 5/2022 | Pandis | G06F 16/2282 |
| 11,323,513 B1 * | 5/2022 | Vibhor | G06N 7/005 |
| 2002/0019945 A1 | 2/2002 | Houston et al. | |
| 2002/0056043 A1 | 5/2002 | Glass | |
| 2002/0065938 A1 | 5/2002 | Jungck et al. | |
| 2002/0080123 A1 | 6/2002 | Kennedy et al. | |
| 2002/0099649 A1 | 7/2002 | Lee et al. | |
| 2002/0163934 A1 | 11/2002 | Moore et al. | |
| 2002/0194159 A1 * | 12/2002 | Kamath | G06K 9/6282 |
| 2003/0041042 A1 * | 2/2003 | Cohen | G06N 3/126 706/45 |
| 2003/0083764 A1 | 5/2003 | Hong | |
| 2003/0110394 A1 | 6/2003 | Sharp et al. | |
| 2003/0135612 A1 | 7/2003 | Huntington et al. | |
| 2003/0212629 A1 * | 11/2003 | King | G07F 7/08 705/39 |
| 2003/0233305 A1 * | 12/2003 | Solomon | G06Q 30/06 705/37 |
| 2004/0034666 A1 | 2/2004 | Chen | |
| 2004/0186882 A1 | 9/2004 | Ting | |
| 2004/0193512 A1 | 9/2004 | Gobin et al. | |
| 2005/0021650 A1 | 1/2005 | Gusler et al. | |
| 2005/0154692 A1 | 1/2005 | Jacobsen et al. | |
| 2005/0081158 A1 | 4/2005 | Hwang | |
| 2005/0177483 A1 | 8/2005 | Napier et al. | |
| 2006/0101048 A1 | 5/2006 | Mazzagatti et al. | |
| 2006/0155751 A1 | 7/2006 | Geshwind et al. | |
| 2006/0190310 A1 | 8/2006 | Gudia et al. | |
| 2006/0212270 A1 | 9/2006 | Shiu et al. | |
| 2007/0277224 A1 | 11/2007 | Osborn et al. | |
| 2008/0028446 A1 * | 1/2008 | Burgoyne | H04L 63/0428 726/6 |
| 2008/0104007 A1 * | 5/2008 | Bala | G06K 9/6282 706/59 |
| 2009/0059793 A1 | 3/2009 | Greenberg | |
| 2009/0094677 A1 | 4/2009 | Pietraszek et al. | |
| 2009/0140838 A1 | 6/2009 | Newman et al. | |
| 2009/0174667 A1 | 7/2009 | Kocienda et al. | |
| 2009/0201257 A1 | 8/2009 | Saitoh et al. | |
| 2009/0202153 A1 | 8/2009 | Cortopassi et al. | |
| 2009/0307176 A1 | 12/2009 | Jeong et al. | |
| 2009/0313693 A1 | 12/2009 | Rogers | |
| 2010/0066540 A1 | 3/2010 | Theobald et al. | |
| 2010/0130181 A1 | 5/2010 | Won | |
| 2010/0169958 A1 | 7/2010 | Werner et al. | |
| 2010/0225443 A1 | 9/2010 | Bayram et al. | |
| 2011/0055907 A1 | 3/2011 | Narasimhan et al. | |
| 2011/0070864 A1 | 3/2011 | Karam et al. | |
| 2011/0082911 A1 | 4/2011 | Agnoni et al. | |
| 2011/0145587 A1 | 6/2011 | Park | |
| 2011/0251951 A1 | 10/2011 | Kolkowitz et al. | |
| 2011/0298753 A1 | 12/2011 | Chuang et al. | |
| 2012/0041683 A1 | 2/2012 | Vaske et al. | |
| 2012/0124662 A1 | 5/2012 | Baca et al. | |
| 2012/0127102 A1 | 5/2012 | Uenohara et al. | |
| 2012/0151553 A1 | 6/2012 | Burgess et al. | |
| 2013/0071816 A1 | 3/2013 | Singh et al. | |
| 2013/0117246 A1 | 5/2013 | Cabaniols et al. | |
| 2013/0231974 A1 | 9/2013 | Harris et al. | |
| 2013/0339141 A1 | 12/2013 | Stibel et al. | |
| 2014/0006347 A1 | 1/2014 | Qureshi et al. | |
| 2014/0067656 A1 | 3/2014 | Cohen et al. | |
| 2014/0149130 A1 | 5/2014 | Getchius | |
| 2014/0366159 A1 | 12/2014 | Cohen | |
| 2015/0039473 A1 | 2/2015 | Hu et al. | |
| 2015/0220509 A1 | 8/2015 | Karov Zangvil et al. | |
| 2015/0264573 A1 | 9/2015 | Giordano et al. | |
| 2015/0348041 A1 | 12/2015 | Campbell et al. | |
| 2016/0041984 A1 | 2/2016 | Kaneda et al. | |
| 2016/0352759 A1 | 12/2016 | Zhai | |
| 2017/0039219 A1 | 2/2017 | Acharya et al. | |
| 2017/0154382 A1 | 6/2017 | McLaughlin et al. | |
| 2017/0163664 A1 | 6/2017 | Nagalla et al. | |
| 2017/0177743 A1 | 6/2017 | Bhattacharjee et al. | |
| 2017/0300911 A1 | 10/2017 | Alnajem | |
| 2018/0107944 A1 | 4/2018 | Lin et al. | |
| 2018/0342328 A1 * | 11/2018 | Chan | G06F 16/951 |
| 2018/0349924 A1 | 12/2018 | Shah et al. | |
| 2019/0197189 A1 | 6/2019 | Studnicka | |
| 2019/0205977 A1 * | 7/2019 | Way | G06N 20/00 |
| 2019/0228411 A1 | 7/2019 | Hernandez-Ellsworth et al. | |
| 2019/0347281 A1 | 11/2019 | Natterer | |
| 2019/0349371 A1 | 11/2019 | Smith et al. | |
| 2019/0373001 A1 | 12/2019 | Deeb et al. | |
| 2019/0392487 A1 * | 12/2019 | Duke | G06N 3/08 |
| 2020/0019964 A1 | 1/2020 | Miller et al. | |
| 2020/0117800 A1 | 4/2020 | Ramberg et al. | |

(56) References Cited

U.S. PATENT DOCUMENTS

| | | | |
|---|---|---|---|
| 2021/0049326 A1 | 2/2021 | Amend et al. | |
| 2021/0224663 A1* | 7/2021 | Gil | G06N 20/00 |
| 2022/0156526 A1* | 5/2022 | Chen | G06N 3/08 |

FOREIGN PATENT DOCUMENTS

| | | | |
|---|---|---|---|
| EP | 2653982 A1 | 10/2013 | |
| EP | 2636149 A4 | 10/2016 | |
| IL | 176551 A | 9/2012 | |
| IN | 219405 | 3/2007 | |
| KR | 10-0723738 B1 | 5/2007 | |
| TW | 201723907 A | 7/2017 | |
| WO | 01/25914 A2 | 4/2001 | |
| WO | 02/87124 A1 | 10/2002 | |
| WO | 2002/100039 A2 | 12/2002 | |
| WO | 03/73724 A2 | 9/2003 | |
| WO | 2005/067209 A1 | 7/2005 | |
| WO | 2012/061701 A1 | 5/2012 | |
| WO | 2014/145395 A2 | 9/2014 | |
| WO | 2017/096206 A1 | 6/2017 | |
| WO | 2017/209799 A1 | 12/2017 | |

OTHER PUBLICATIONS

"Distributed Mining of Classification Rules", By Cho and Wuthrich, 2002 http://www.springerlink.com/(21nnasudlakyzciv54i5kxz0)/app/home/contribution.asp?referrer=parent&backto=issue,1,6;journal,2,3,31;linkingpublicationresults,1:105441,1.

Bansal, Nikhil, Avrim Blum, and Shuchi Chawla. "Correlation clustering." Machine Learning 56.1-3 (2004): 89-113.

Finley, Thomas, and Thorsten Joachims. "Supervised clustering with support vector machines." Proceedings of the 22nd international conference on Machine learning, ACM, 2005.

Meia et al., Comparing clusterings-an information based distance, Journal of Multivariate Analysis 98 (2007) 873-895.

Appaloosa Store, "Siring Similarity Algorithms Compared", Apr. 5, 2018, webpage downloaded on Oct. 20, 2020 rom https://medium.com/ɤ appaloosastore/string-similarity-algorithms-compared-3f7b4d12f0ff.

Banon, Shay, "Geo Location and Search", elastic blog post, Aug. 16, 2010, webpage found at https://www.elastic.co/blog/geo-location-and-search on Oct. 15, 2019.

Bottomline Technologies, Bottomline Cyber Fraud & Risk Management:Secure Payments, marketing brochure.

Brasetvik, Alex, "Elasticsearch from the Bottom Up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Experian, "Fuzzy address searching", webpage downloaded from https://www.edq.com/glossary/fuzzy-address-searching/ on Oct. 8, 2019.

Fenz, Dustin, et al., "Efficient Similarity Search in Very Large String Sets", conference paper, Jun. 2012.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

International Search Report for corresponding International Application No. PCT/US2016/064689 dated Feb. 22, 2017.

Jeremy Olshan, How my bank tracked me to catch a thief, MarketWatch, Apr. 18, 2015.

Mitchell, Stuart, et al., "pulp Documentation", Release 1.4.6, Jan. 27, 2010.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Soroumejad, Zahra Zojaji, Reza Ebrahimi Atani, Amir Hassan Monadjemi, "A Survey of Credit Card Fraud Detection Techniques: Data and Technique Oriented Perspective", 2016.

Schulz, Klaus and Stoyan Mihov, "Fast String Correction with Levenshtein-Automata", IJDAR (2002) 5: 67. https://doi.org/10.1007/s10032-002-0082-8.

The Telnet Protocol Microsoft Knowledgebase; entered into the case on Apr. 18, 2013.

Vogler, Raffael, "Comparison of Siring Distance Algorithms", Aug. 21, 2013, webpage downloaded on Oct. 20, 2020 from https://www.joyofdala.de/blog/comparison-of-string-distance-algorithms.

Wikil Kwak, Yong Shi, John J. Cheh, and Heeseok Lee, "Multiple Criteria Linear Programming Data Mining Approach: An Application for Bankruptcy Prediction",: Data Mining and Knowledge Management, Chinese Academy of Sciences Symposium, 2004, LNAI 3327, pp. 164-173, 2004.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Written Opinion of the International Searching authority for corresponding International Application No. PCT/US2016/064689 dated Feb. 22, 2017.

\* cited by examiner

| ID 801 | BANK 802 | | CREDIT AGENCY 803 | | REGISTRY OF DEEDS 804 | |
|---|---|---|---|---|---|---|
| SSN | Loan Default | Amount Borrowed | Credit Score | Total Debt | Home Ownership | Home Value |
| 012-34-5678 | − | $ 10,000 | 575 | $ 500,000 | Y | $ 650,000 |
| 012-34-5679 | + | $ 12,000 | 829 | $ − | Y | $ 750,000 |
| 012-34-5670 | − | $ 15,000 | 700 | $ 30,000 | N | $ 50,000 |
| 012-34-5671 | − | $ 11,000 | 600 | $ 400,000 | Y | $ 350,000 |
| 012-34-5672 | + | $ 27,000 | 625 | $ 30,000 | N | $ − |
| 012-34-5673 | + | $ 9,000 | 715 | $ 900,000 | Y | $ 1,250,000 |
| 012-34-5674 | + | $ 13,000 | 735 | $ 125,000 | Y | $ 500,000 |
| 012-34-5675 | + | $ 15,000 | 800 | $ 10,000 | N | $ − |
| 012-34-5676 | + | $ 25,000 | 690 | $ 295,000 | Y | $ 400,000 |
| 012-34-5677 | + | $ 33,000 | 825 | $ 85,000 | Y | $ 275,000 |

*Figure 8*

| Feature Data Manager 1202 | Unsupervised Event Junction 1201 | | | | |
|---|---|---|---|---|---|
| Feature Data Set 1203 | <name> 1206 | <name> | ... | <name> 1207 | <name> |
| Event Number 1204 | Join Feature Attribute Values 1205 | | | | |
| 0 | <value> | <value> | ... | <value> | <value> |
| 1 | <value> | <value> | ... | <value> | <value> |
| ... | ... | ... | | ... | ... |

*Figure 12*

DISTRIBUTED PREDICTIVE ANALYTICS DATA SET

PRIOR APPLICATION

This application is a priority application.

BACKGROUND

Technical Field

The system, apparatuses and methods described herein generally relate to machine learning techniques, and, in particular, to predictive analytics solutions using distributed data.

Description of the Related Art

Typically, data sets that are used in predictive analytics solutions (PA) are represented by a category of instances where each instance stores the values of several attributes/features. Most of the existing predictive analytics tools (e.g., the ones using the knowledge discovery/data mining/predictive analytics techniques) assume that all the data shall be collected in a single host machine and represented by a homogeneous data and metadata structure.

In computing, extract, transform, load (ETL) is the general procedure of copying data from one or more sources into a destination system which represents the data differently from the source(s). The term comes from the three basic steps needed: extracting (selecting and exporting) data from the source, transforming the way the data is represented to the form expected by the destination, and loading (reading or importing) the transformed data into the destination system.

As we experience exponential growth in data, this assumption requires definition and implementation of complex ETL processes, and in many siloed data collecting scenarios it is technically infeasible and/or cost-prohibiting. Data silos were created to address specific business objectives, and as such, most of the enterprise data warehousing systems are challenged by the inability to aggregate data to support predictive analytics based decision-making.

The distributed nature of data exhibits two types of data fragmentation (see FIG. 6A and FIG. 6B).

Horizontal fragmentation wherein subsets of instances 611-619 are stored at different sites 610, 620, 630 (FIG. 6A).

Vertical fragmentation wherein subsets of attributes 651-659 of instances are stored at different sites 650, 660, 670 (FIG. 6B).

In addition, almost all predictive analytics algorithms require the data sets to be stored entirely in main memory. If the computational cost exceeds the main memory, then the algorithm is challenged by potential unfeasibility of completion due to memory restrictions or long runtimes. However, with data fragments as units of distribution, the analysis task can be divided into several sub-tasks that operate together in parallel. The distributed data analysis approach would make a better exploitation of the available computing networked infrastructure.

Following the above observations, there have been different, mostly academic research and development oriented efforts (as such solutions are not available in open source repositories) directed towards data analysis from distributed data sources. The problem with most of these efforts is that although they allow the data sources to be distributed over a network of data silos, they assume that the distributed data of comment entities is defined over the same set of features. In other words, they assume that the data is partitioned horizontally (FIG. 6A). In order to fully take advantage of all the available data, the predictive analytics tools must provide for algorithms to handle the data characterized by:

Spatial (or logical) distribution of data silos,
Complexity and multi-feature representations, and
Vertical partitioning/distribution of feature sets.

The Distributed DensiCube modeler and scorer extend the same predictive analytics algorithms that have been already implemented (i.e., Bottomline's DensiCube solution, as partially described in the U.S. Pat. No. 9,489,627, issued to Jerzy Bala on Nov. 8, 2016, said patent incorporated herein in its entirety) to enable their execution in the distributed data siloed environments. The algorithm described in U.S. Pat. No. 9,489,627, distributed, is one possible embodiment of the inventions herein. Other machine learning algorithms could also be used.

The immediate benefits of the Distributed DensiCube include:

Privacy preserving of the data assets in the model generation and prediction modes of operation.

Cost reduction of implementing complex ETL processes and data warehousing in general.

Capability to use Distributed DensiCube for non-distributed predictive analytics in the parallel computational mode (i.e., executing the predictive analytics algorithms on a distributed computing platforms) to support computationally cost effective model generation.

Capability to Distributed DensiCube for unsupervised learning to support outlier detection (e.g., fraud detection from distributed data sources).

Capability of predictive analytics solutions operate and react in real time on a low-level transactional streaming data representation while not requiring data aggregation.

The Distributed DensiCube approach represents a paradigm shift of moving from the currently predominant Data Centric approaches to predictive analytics, i.e., approaches that transform, integrate, and push data from distributed silos to predictive analytics agents, to the future Decision Centric (Predictive Analytics Bot Agent based approaches, i.e., approaches that push predictive analytics agents to the data locations and by collaborating support decision-making in the distributed data environments).

Collaborating Predictive Analytics Bot Agents can facilitate numerous opportunities for enterprise data warehousing to provide faster, more predictive/prescriptive, and time and cost saving decision-making solutions for their customers.

Examples of the use of this in banking applications where each branch has its own database 610, 620, 630 of customers 611-619. For privacy, security and performance reasons, the data is kept in the branches, but the bank needs to use the data from each branch for its machine learning algorithms. The predictive analytics data needs to be aggregated into a model without transferring the data to a central location.

Similarly, when opening a new account at a bank, machine learning models need to be built for predicative analytics. The data for the customer 802 may be in the branch database for the customer name and address, the customer's credit history may be in a separate database with a credit bureau (such as Equifax, Experian and TransUnion) 803, and the customers real estate holdings and mortgages may be in a third database at the registry of deeds 804 (see FIG. 8 for example). The predictive analytics model needs to be built using data from each of these databases without being able to aggregate the data at a single location.

There is a need in the industry for the building of machine learning models using distributed data without moving the data.

BRIEF SUMMARY OF THE INVENTION

A distributed method for creating a machine learning rule set is described herein. The method is made up of the steps of (1) preparing, on a computer, a set of data identifiers to identify the data elements for training the machine learning rule set, (2) sending the set of data identifiers to a plurality of data silos; (3) executing, on each data silo, a machine learning algorithm using the data elements and the data identifiers on the data silo to derive a silo specific rule set; (4) calculating, on each data silo, a quality control metric on the silo specific rule set; (5) sending the quality control metric from each data silo to the computer; and (5) combining, on the computer, the quality control metrics from each data silo into a combined quality control metric.

In some embodiments, the quality control metric is an F-Score. The combined quality control metric could use a weighted algorithm. The data silos could be made up of a special purpose processor and a special purpose storage facility.

In some embodiments, the method also includes sending the silo specific rule sets to the computer from at least one of the plurality of data silos. And the method could further include sending a plurality of silo specific rule sets and quality control metrics associated with the silo specific rule sets, from the data silos to the computer. Yet in other embodiments, the silo specific rule sets are not returned to the computer. In some cases, a set of training results are sent with the identifiers to the plurality of data silos from the computer. The machine learning algorithm could create a test rule by adding a condition, calculating a test quality metric, and saving the test rule and test quality metric if the quality metric is better than previously saved test quality metrics. In some cases, the condition could be a range locating clusters of data.

A distributed system for creating a machine learning rule set is also described herein. The system is made up of a computer, a network, and a plurality of data silos. The computer executes software to prepare a set of data identifiers to identify data elements in a plurality of data silos. The network connected to the computer and the data silos and sends data between them. The plurality of data silos each independently execute machine learning software to create a silo specific rule set based on the data identifiers and silo specific data elements, and calculate silo specific quality control metrics for the silo specific rule set, and the data silos return the silo specific quality control metrics to the computer. The computer executes software to combine the quality control metrics from each data silo into a combined quality control metric.

BRIEF DESCRIPTION OF THE DRAWINGS

FIG. 8 is a view of a database distributed over three servers.
FIG. 12 is an overview of the distributed data structure upon which the distributed machine learning algorithm is performed.

DETAILED DESCRIPTION

The following description outlines several possible embodiments to create models using distributed data. The Distributed DensiCube modeler and scorer described below extend the predicative analytic algorithms that are described in U.S. Pat. No. 9,489,627 to extend their execution in distributed data environments and into quality analytics. The rule learning algorithm for DensiCube is briefly described below. But the DensiCube machine learning algorithm is only one embodiment of the inventions herein. Other machine learning algorithms could also be used.

Rule Learning Algorithm

Figure 1:
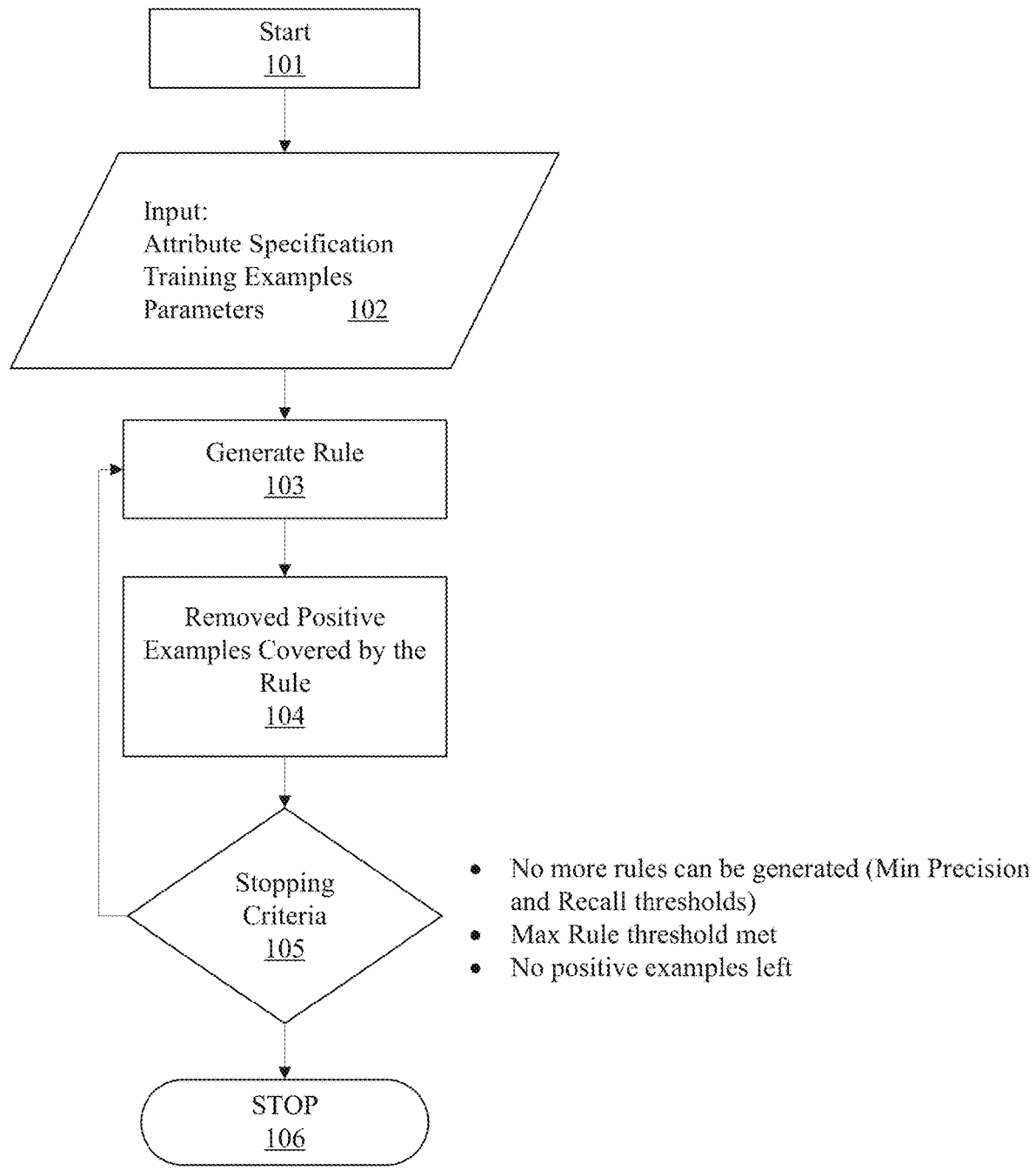
FIG. 1 is a flowchart showing rule generation.

The rule learning algorithm induces a set of rules. A rule itself is a conjunction of conditions, each for one attribute. A condition is a relational expression in the form:

$$A=V,$$

where A is an attribute and V is a nominal value for a symbolic attribute or an interval for a numeric attribute. The rule induction algorithm allows for two important learning parameters 102: minimum recall and minimum precision. More specifically, rules generated by the algorithm must satisfy the minimum recall and minimum precision requirements 105 as set by these parameters 102. The algorithm repeats the process of learning a rule 103 for the target class and removing all target class examples covered by the rule 104 until no rule can be generated to satisfy the minimum recall and minimum precision requirements 105 (FIG. 1). In the distributed DensiCube algorithm, the removal of the positive examples covered by the rule is done in parallel at each of the distributed servers that hold the data.

Figure 2:
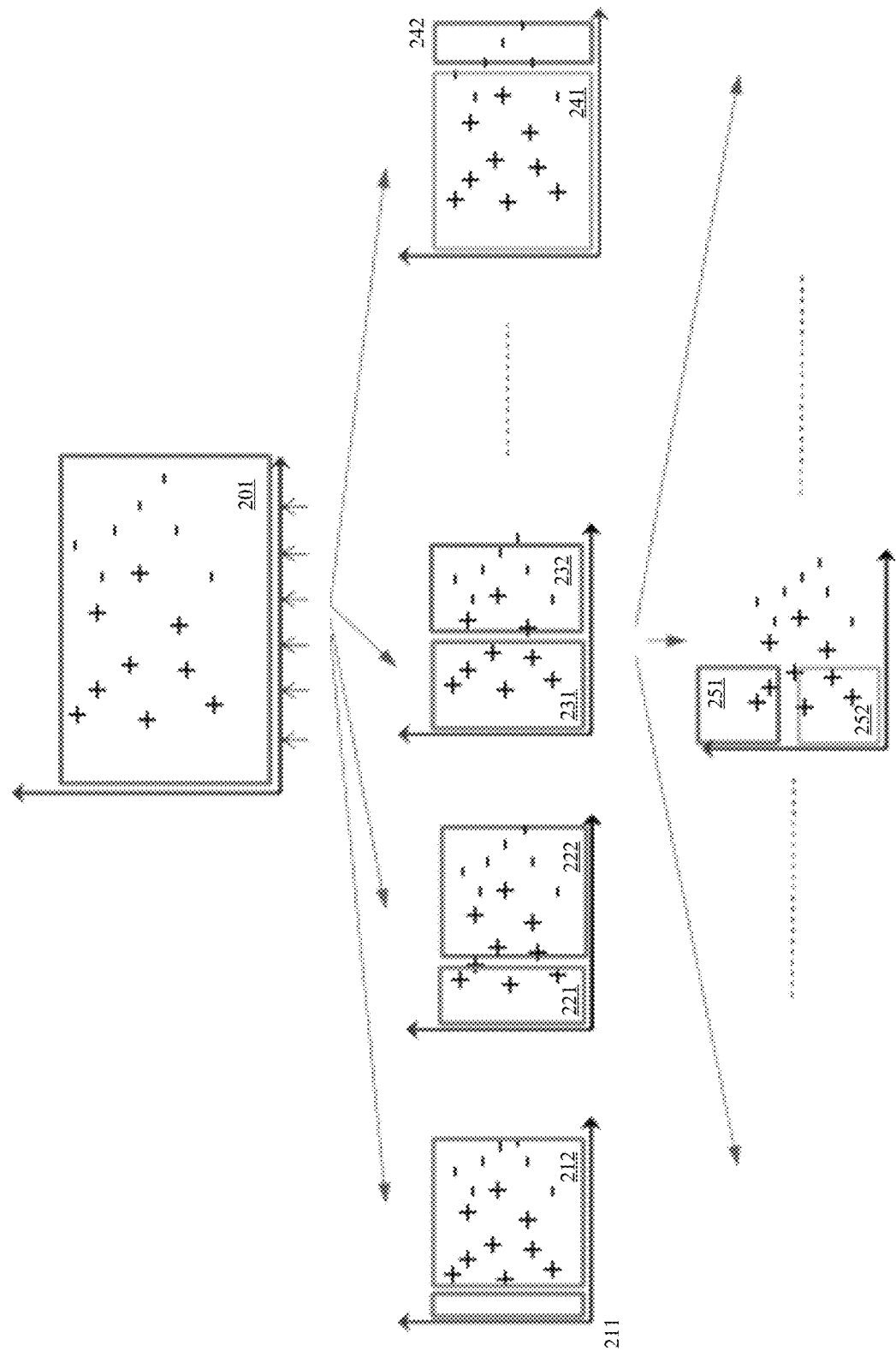
FIG. 2 shows a K-beam search based on rule specialization.

In learning a rule, as seen in FIG. 2, the algorithm starts with the most general rule 201, which covers the entire feature space (all examples both positive and negative) and then conducts a general-to-specific beam search. At each step of the search, the algorithm maintains a set of k best rules (rules with the largest F-measure scores), where k is a user defined parameter. A smaller k translates into a smaller search space, hence a faster search. Each of the best rules is specialized by either adding a new condition or reducing the interval of a condition of a numeric attribute. This search process repeats until the recalls of all rules are smaller than the minimum recall and the best rule is the rule generated by the rule search process. However, any rule learning approach that follows the covering rule generation schema can be used here (i.e., search for the "best" rule, remove the data explained/covered by this rule, and repeat the search process).

Looking at 211, 212, the rule 212 covers all of the positive and negative values, and rule 211 is empty. This rule set is then scored and compared to the base rule 201. The best rule is stored.

Next, the algorithm increments the x-axis split between the rules, creating rule 231 and 232. The rules are scored and compared to the previous best rule.

The process is repeated until all but one increment on the x-axis is left. These rules 241, 242 are then scored, compared, and stored if the score is better.

Once the x-axis has been searched, the best rules are then split on the y-axis (for example, 251,252) to find the best overall rule. This process may be repeated for as many axes as found in the data.

In the Distributed DensiCube algorithm, the functions shown in FIG. 2 are performed independently on multiple data silos operating on the different features that reside on those silos.

Figure 3:
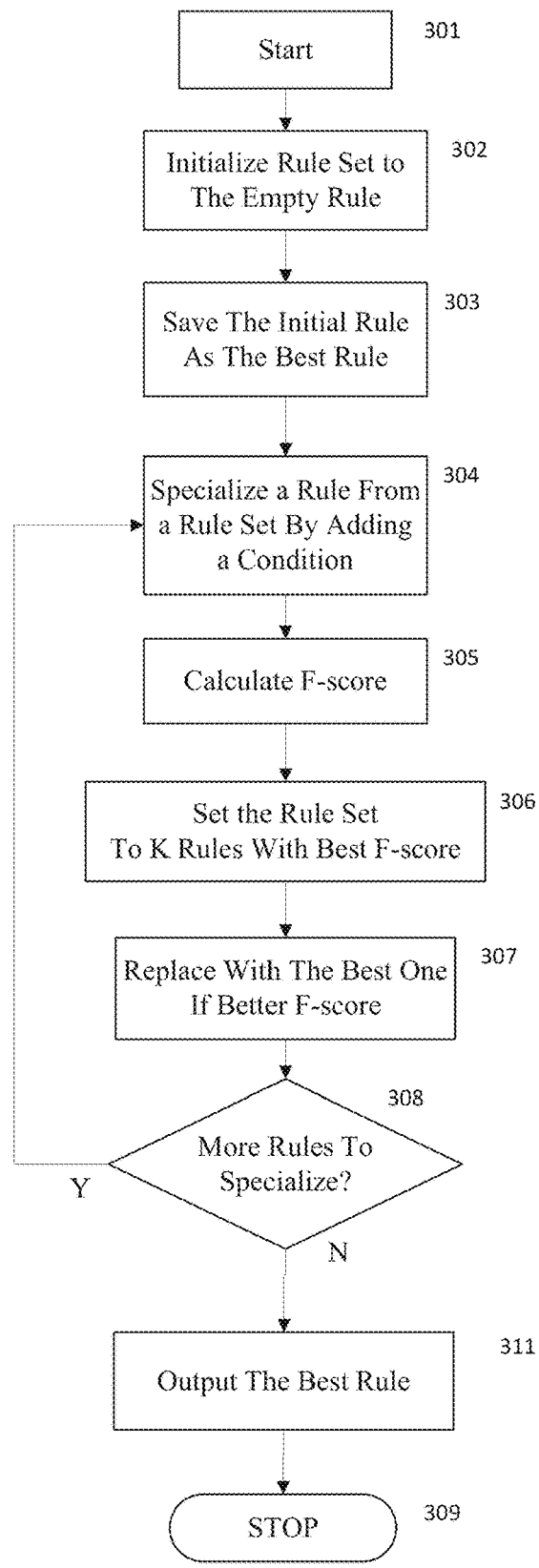
FIG. 3 is a flow chart of rule specialization and evaluation.

FIG. 3 depicts the internal process of generating a singular rule. It starts 301 with the step of initializing the risk model with a rule that describes the whole representation space 302 (i.e., a rule with conditional parts satisfying all attributes values). The initial rule is stored as the best rule 303. This rule is iteratively specialized via a k-beam search process of re-referencing its value ranges for each of the attributes 304. The specialization includes calculating the F-score 305, setting the rule set to the K rules with the best F-score 306, and replacing the Best Rule if this rule has the better F-Score 307. This continues while there are more rules to specialize 308. If not, the algorithm outputs the Best Rule 311 and stops 309. The top k rules, based on the evaluation measure, are maintained on the candidate list 405 during this process. All the rules on the candidate list 405 are evaluated and ranked. The best rule from the candidate rule list (i.e., an internal rule set maintained by the beam search algorithm) enters the model rule list (FIG. 4).

In the Distributed DensiCube algorithm, the entire process described in FIG. 3 is distributed, performed on each data silo.

Figure 4:
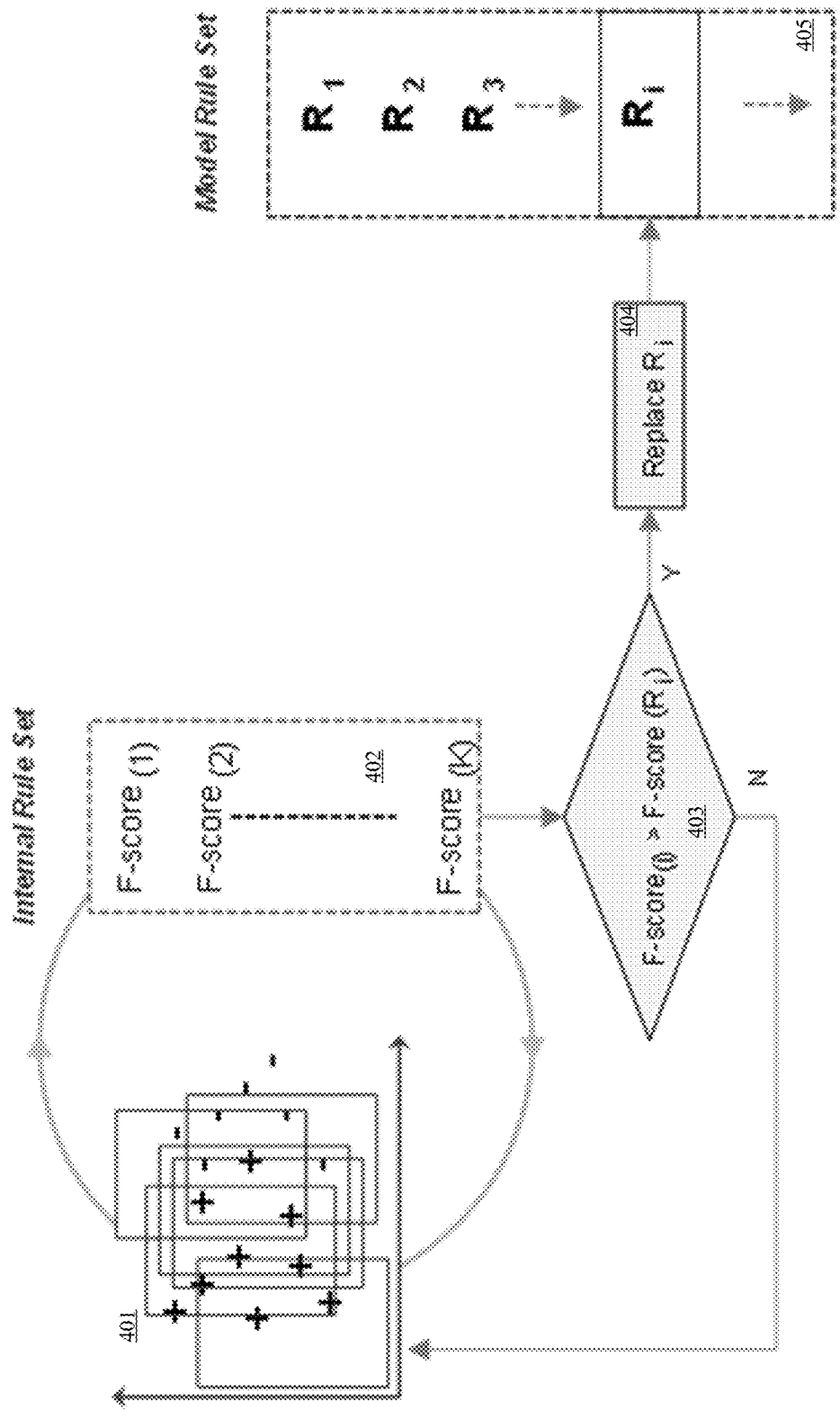
FIG. 4 illustrates a rule generation process with the internal rule list and the final model rule list.

Looking at FIG. 4, the rule 401 is analyzed and the F-scores of each sub-rule is recorded in the internal rule set 402. If the F-score 402 for the rule 401 is greater than the last F-score 403, then the last rule is replaced by the new rule 404. Various algorithms could be reserved here, for instance, the rule set could be a sorted list of pairs of the rule set and the rule's F-score. Also, the statistics of other machine learning quality measures could be used. When comparing 403, the list is searched and the new rule inserted 404, dropping off the lowest scoring rule set.

Every rule induction algorithm uses a metric to evaluate or rank the rules that it generates. Most rule induction algorithms use accuracy as the metric. However, accuracy is not a good metric for imbalanced data sets. The algorithm uses an F-measure as the evaluation metric. It selects the rule with the largest F-measure score. F-measure is widely used in information retrieval and in some machine learning algorithms. The two components of F-measure are recall and precision. The recall of a target class rule is the ratio of the number of target class examples covered by the rule to the total number of target class examples. The precision of a target class (i.e., misstatement class) rule is the ratio of the number of target class examples covered by the rule to the total number of examples (from both the target and non-target classes) covered by that rule. F-measure of a rule r is defined as:

$$F-\text{measure}(r) = \frac{\beta^2 + 1}{\frac{\beta^2}{\text{recall}(r)} + \frac{1}{\text{precision}(r)}}$$

where $\beta$ is the weight. When $\beta$ is set to 1, recall and precision are weighted equally. F-measure favors recall with $\beta>1$ and favors precision with $\beta<1$. F-measure can be used to compare the performances of two different models/rules. A model/rule with a larger F-measure is better than a model/rule with a smaller F-measure.

Prototype Generation Algorithm for Ranking with Rules

The algorithms incorporate a method, called prototype generation, to facilitate ranking with rules. For each rule generated by the rule learning algorithm, two prototypes are created. In generating prototypes, the software ignores symbolic conditions, because examples covered by a rule share the same symbolic values. Given a rule R with m numeric conditions: $A_{R1}=V_{R1} \wedge A_{R2}=V_{R2} \wedge \ldots \wedge A_{Rm}=V_{Rm}$, where $A_{Ri}$ is a numeric attribute and $V_{Ri}$ is a range of numeric values, the positive prototype of R, $P(R)=(p_{R1}, p_{R2}, p_{Rm})$ and the negative prototype of R $N(R)=(n_{R1}, n_{R2}, n_{Rm})$, where both $p_{Ri} \in V_{Ri}$ and $n_{Ri} \in V_{Ri}$. $p_{Ri}$ and $n_{Ri}$ are computed using the following formulas:

$$p_{Ri} = \frac{\sum_{e \in R(POS)} e_{Ri}}{|R(POS)|} \text{ and } n_{Ri} = \frac{\sum_{e \in R(NEG)} e_{Ri}}{|R(NEG)|},$$

where R(POS) and R(NEG) are the sets of positive and negative examples covered by R respectively, $e=(e_{R1}, e_{R2}, e_{Rm})$ is an example, and $e_{Ri} \in V_{Ri}$ for $i=1, \ldots, m$, because e is covered by R.

Given a positive prototype $P(R)=(p_{R1}, p_{R2}, \ldots, p_{Rm})$ and a negative prototype $N(R)=(n_{R1}, n_{R2}, \ldots, n_{Rm})$ of rule R, the score of an example $e=(e_{R1}, e_{R2}, \ldots, e_{Rm})$ is 0 if e is not covered by R. Otherwise, e receives a score between 0 and 1 computed using the following formula:

$$\text{score}(e, R) = \frac{\sum_{i=1}^{m} w_{Ri} \frac{|e_{Ri} - n_{Ri}| - |e_{Ri} - p_{Ri}|}{|p_{Ri} - n_{Ri}|} + \sum_{i=1}^{m} w_{Ri}}{2 \times \sum_{i=1}^{m} w_{Ri}}$$

where $w_{Ri}$ is the weight of $Ri^{th}$ attribute of R. The value of $$\frac{|e_{Ri} - n_{Ri}| - |e_{Ri} - p_{Ri}|}{|p_{Ri} - n_{Ri}|}$$

is between $-1$ and 1. When $e_{Ri}>n_{Ri}>p_{Ri}$ or $p_{Ri}>n_{Ri}>e_{Ri}$ it is $-1$. When $e_{Ri}>p_{Ri}>n_{Ri}$ or $n_{Ri}>p_{Ri}>e_{Ri}$ it is 1. When $e_{Ri}$ is closer to $n_{Ri}$ than $p_{Ri}$, it takes a value between $-1$ and 0. When $e_{Ri}$ is closer to $p_{Ri}$ than $n_{Ri}$, it takes a value between 0 and 1. The value of score(e,R) is normalized to the range of 0 and 1. If $p_{Ri}=n_{Ri}$, then $$\frac{|e_{Ri} - n_{Ri}| - |e_{Ri} - p_{Ri}|}{|p_{Ri} - n_{Ri}|}$$

is set to 0.

$w_{Ri}$ is computed using the following formula.

$$w_{Ri} = \frac{|p_{Ri} - n_{Ri}|}{\max_{Ri} - \min_{Ri}},$$

where $\max_{Ri}$ and $\min_{Ri}$ are the maximum and minimum values of the $Ri^{th}$ attribute of R, respectively. The large difference between $p_{Ri}$ and $n_{Ri}$ implies that the values of positive examples are very different from the values of negative examples on the $Ri^{th}$ attribute, so the attribute should distinguish positive examples from negative one well.

Scoring Using Rules

A rule induction algorithm usually generates a set of overlapped rules. Two methods, Max and Probabilistic Sum, for combining example scores of multiple rules are used by the software. Both methods have been used in rule-based expert systems. The max approach simply takes the largest score of all rules. Given an example e and a set of n rules $R=\{R_1, \ldots, R_n,\}$, the combined score of e using Max is computed as follows:

$$\text{score}(e,R) = \max_{i=1}^{n} \{\text{Precision}(Ri) \times \text{score}(e,R)\},$$

where precision($R_i$) is the precision of $R_i$. There are two ways to determine score(e,$R_i$) for a hybrid rule. The first way returns the score of e received from rule $R_i$ for all e's. The second way returns the score of e received from $R_i$ only if the score is larger than or equal to the threshold of $R_i$, otherwise the score is 0. The first way returns. For a normal rule, $$\text{score}(e, R_i) = \begin{cases} 1 & \text{if } e \text{ is covered by } R_i \\ 0 & \text{Otherwise} \end{cases}$$

For the probabilistic sum method, the formula can be defined recursively as follows.

$$\text{score}(e,\{R_1\}) = \text{score}(e,R_1)$$

$$\text{score}(e,\{R_1,R_2\}) = \text{score}(e,R_1) + \text{score}(e,R_2) - \text{score}(e,R_1) \times \text{score}(e,R_2)$$

$$\text{score}(e,\{R_1, \ldots, R_n\}) = \text{score}(e,\{R_1, \ldots, R_{n-1}\}) + \text{score}(e,R_n) - \text{score}(e,\{R_1, \ldots, R_{n-1}\}) \times \text{score}(e,R_n)$$

Hardware Architecture

Figure 5:
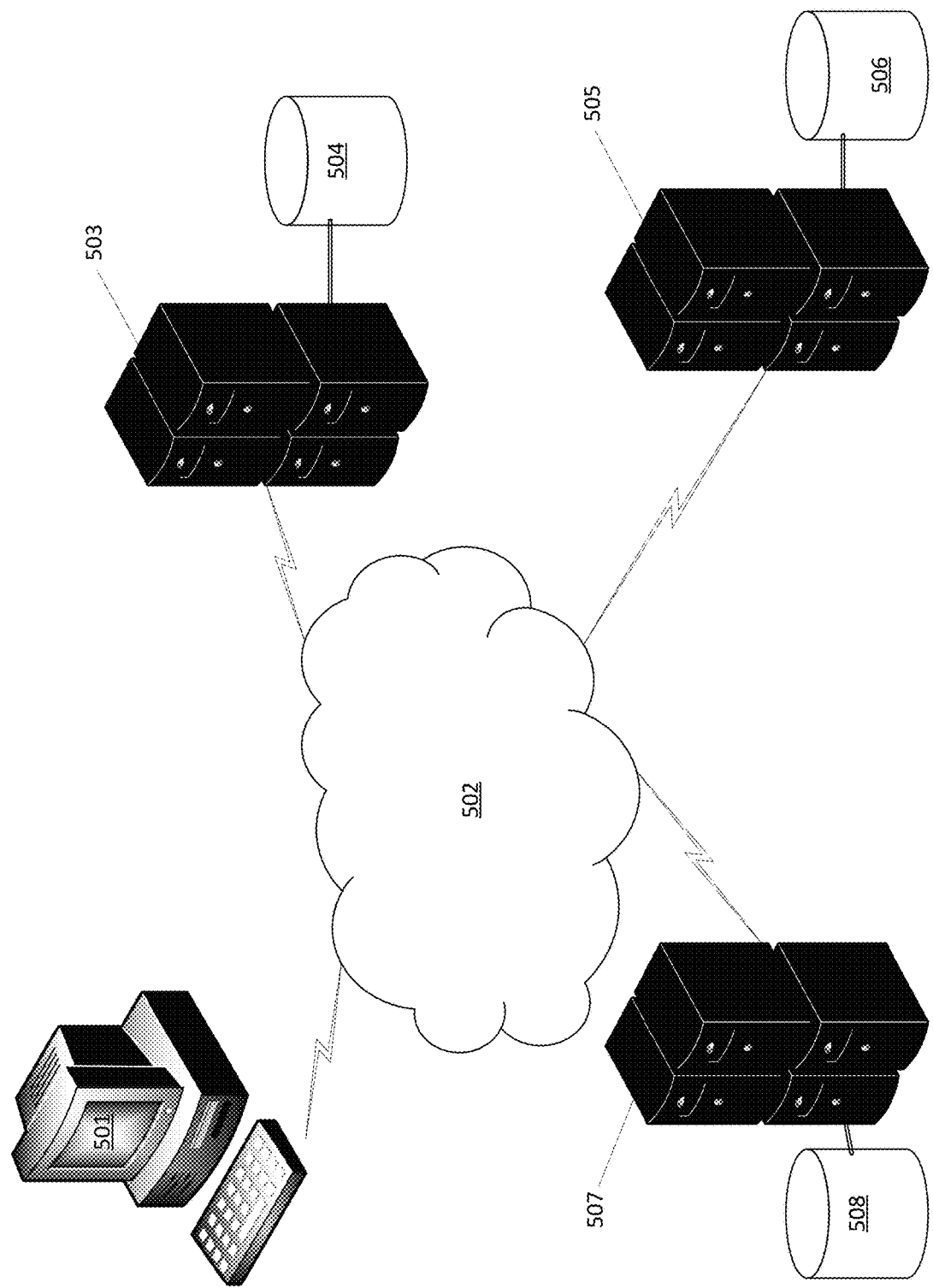
FIG. 5 is an electrical architecture of one embodiment.
Figure 6A:
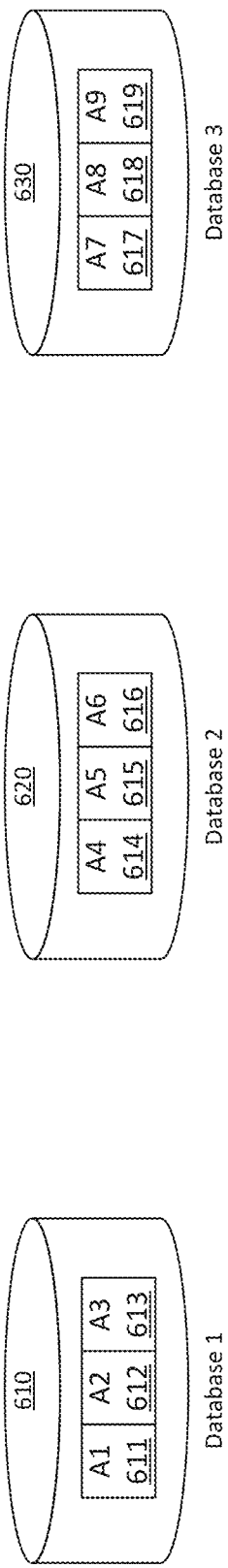
FIG. 6A is a diagram showing horizontal fragmentation of the data across multiple sites.
Figure 6B:
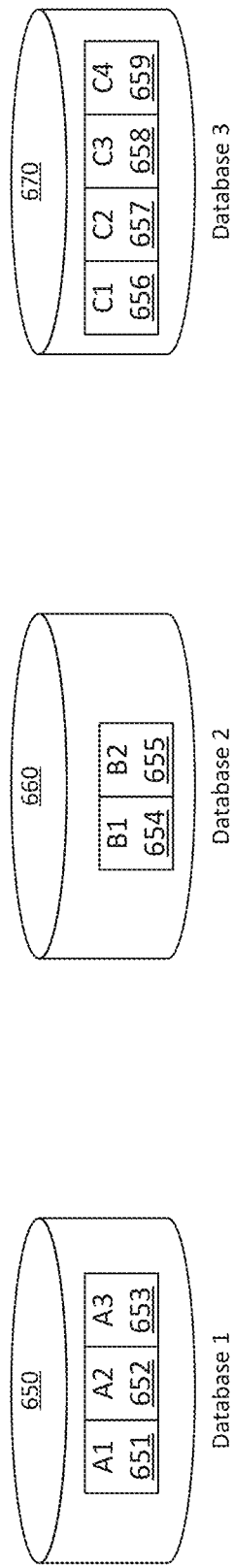
FIG. 6B shows a diagram showing vertical fragmentation of attributes across multiple sites.

Turning to FIG. 5, we see a hardware architecture for implementing the distributed DensiCube algorithms. At the center of the distributed architecture is the cloud 502, which could be implemented as any type of network, from the Internet to a local area network or similar. Off of the cloud 502 are three servers 503, 505, 507, although any number of servers could be connected to the cloud 502. Each server 503, 505, 507 have a storage facility 504, 506, 508. There storage facilities 504, 506, 508 hold the databases as seen in FIGS. 6A and 6B 610, 620, 630, 650, 660, 670. Personal computer 501 (a laptop, desktop or server 1001) could operate the algorithms to combine the distributed rules or this combination could occur on any server 503, 505, 507. The servers 503, 505, 507 (or data silos 1002) are not ordinary computers as the servers must have the performance to handle the highly computationally intensive efforts to operate the DensiCube algorithm described above. In addition, for many datasets, the storage facilities 504, 506, 508 must be able to hold very large databases 610, 620, 630, 650, 660, 670.

Distributed DensiCube

By allowing for distributed execution, the Distributed DensiCube algorithm allows for a number of important benefits. First of all, privacy of the data assets in the model generation and prediction modes of operation are preserved by keeping the data in its original location and limiting access to the specific data. Second, the cost of implementing complex ETL processes and data warehousing in general is reduced by eliminating the costs of transmission to and storage in a central location. Third, these inventions increase performance by allowing parallel execution of the DensiCube algorithm (i.e., executing the predictive analytics algorithms on a distributed computing platforms). In addition, this distributed algorithm provides the capability for the Distributed DensiCube algorithm to provide unsupervised learning (e.g., fraud detection from distributed data sources). Finally, it allows predictive analytics solutions to operate and react in real time on a low-level transactional streaming data representation without requiring data aggregation.

The Distributed DensiCube approach represents a paradigm shift of moving from the currently predominant Data Centric approaches to predictive analytics, i.e., approaches that transform, integrate, and push data from distributed silos to predictive analytics agents, to the future Decision Centric (predictive analytics bot agent based) approaches, i.e., approaches that push predictive analytics agents to the data locations and by collaborating support decision-making in the distributed data environments.

Essentially, the distributed DensiCube algorithm operates the Densicube algorithm on each server 503, 505, 507 analyzing the local data in the database 504, 506, 508. The best rule or best set of rules 405 from each server 503, 505, 507 is then combined into the best overall rule. In some embodiments, several servers could work together to derive a best rule, that is combined with another server.

Collaborating predictive analytics bot agents can facilitate numerous opportunities for enterprise data warehousing to provide faster, more predictive, more prescriptive, and time and cost saving decision-making solutions for their customers.

1.0 Distributed DensiCube Concept of Operation

The following sections describe the concept behind the Distributed DesiCube approach. As mentioned in the previous section, the Distributed DensiCube solution continues to use the same modeling algorithms as the current non-distributed predictive analytics solution (with modifications to the scoring algorithms to support privacy by preserving the data assets in silos).

1.1 Distributed Modeling

The Distributed DensiCube operates on distributed entities at different logical and/or physical locations.

The distributed entity represents a unified virtual feature vector describing an event (e.g., financial transaction, customer campaign information). Feature subsets 704, 705 of this representation are registered/linked by a common identifier (e.g., transaction ID, Enrolment Code, Invoice ID, etc.) 707. Thus, a distributed data 701 represents a virtual table 706 of joined feature subsets 704, 705 by their common identifier 707 (see FIG. 7).

Figure 7:
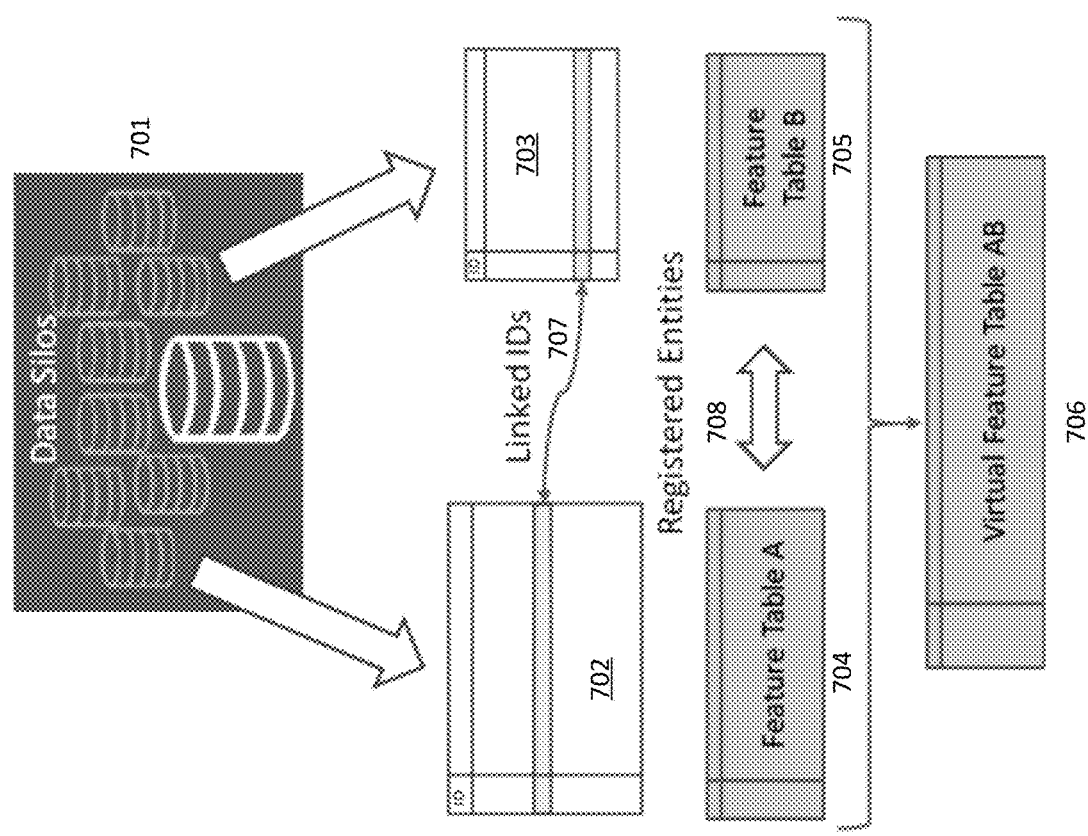
FIG. 7 is a view of a virtual feature table showing the distributed entities.

In FIG. 7, there are a number of data silos 701 located at distributed locations across a network. Two of these data sets 702, 703 are called out in FIG. 7, although any number of data sets could be used. The data sets 702, 703 are essentially tables in some embodiments, each with an identifier column. These identifiers provide a link 707 between records in the two data sets 702, 703. In most, but not all, embodiments, there is a one to one correspondence between the records in the data sets 702, 703. The records in the data sets 702, 703 include feature tables 704, 705 of the registered entities 708 (registered records of the data sets 702, 703). These feature tables 704, 705 are virtually combined into a virtual feature table 706.

As an example of the distributed DensiCube algorithm, see FIG. 8. In this figure, there is an identifier 801 that is a social security number (SSN). The identifier 801 is used in each of the three databases 802, 803, 804. In this simplified example, the bank database 802 contains three fields, the ID (SSN), the Default field, and the amount borrowed. The Default field is a negative if the loan is in default and positive if the loan is current.

Figure 9A:
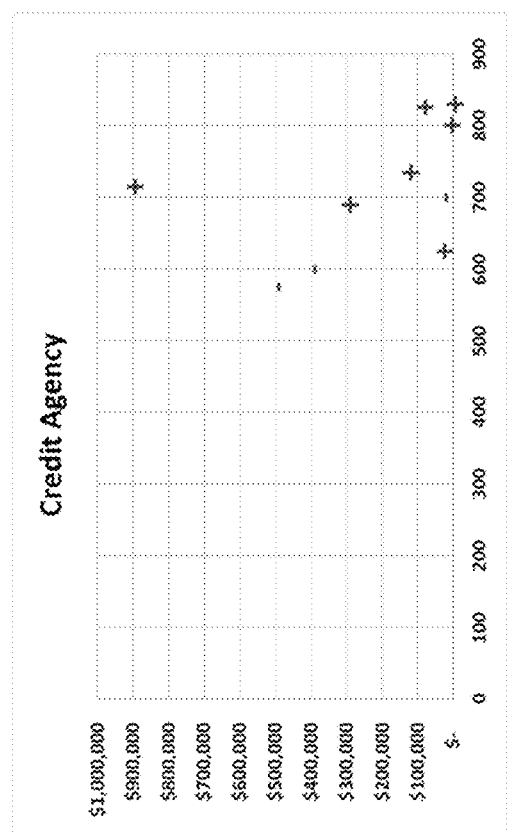
FIG. 9A is a graphical view of the data from FIG. 8 from one of the servers.
Figure 9B:
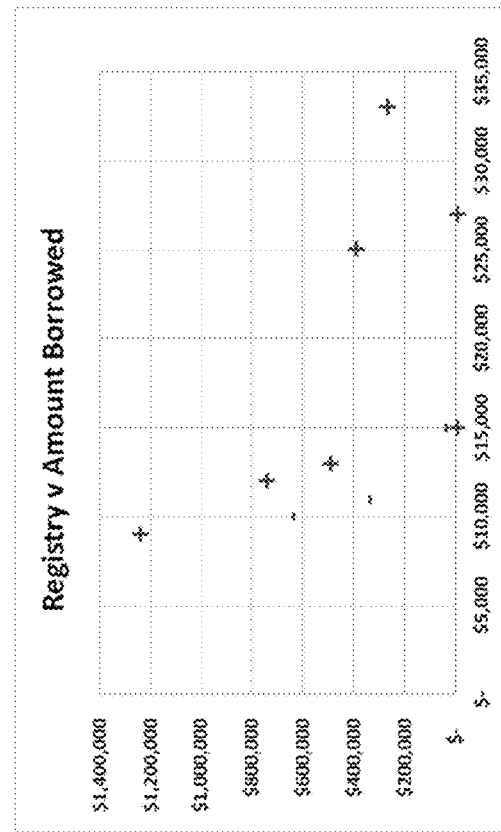
FIG. 9B is a graphical view of the data from FIG. 8 from two of the servers.

The credit agency database 803 contains three fields, the ID (SSN), the Credit Score, and the Total Debt fields. The registry of deeds database 804 also has three fields in this example, the ID (SSN), a home ownership field, and a home value field. In our example, there are a number of reasons that the data in the credit agency 803 needs to be kept separate from the registry data 804, and both of those dataset need to be kept separate from the bank data 802. As a result, the DensiCube algorithm is run three times on each of the databases 802, 803, 804. In another embodiment, two of the servers could be combined, with the algorithm running on one of the servers. This embodiment is seen in FIG. 9B, where the registry data 805 is combined with the bank information 803 to create a scatter diagram to perform the DensiCube algorithm upon. In FIG. 9A, the data from the credit agency database 803 is diagramed independently from the other datasets. The DensiCube algorithm is then run on this scatter diagram.

Figure 10:
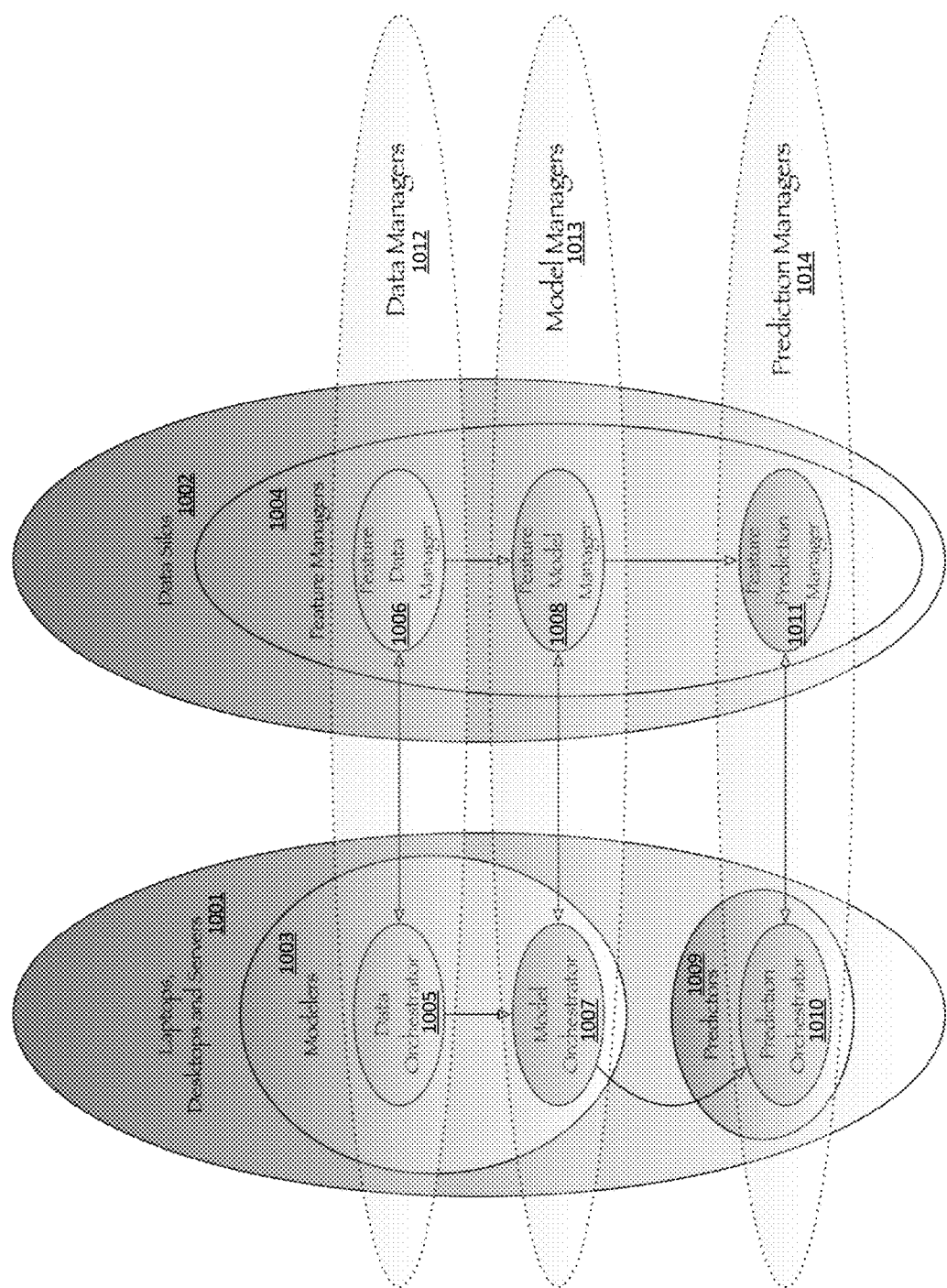
FIG. 10 illustrates the communication between the Distributed DensiCube components.

As seen in FIG. 10, the Distributed DensiCube is accomplished via a synchronized collaboration of the following components, operating on the laptops, desktops, or servers 1001 (see also 501 in FIG. 5) and the plurality of data silos 1002 (see also 503-508 in FIG. 5):

Modeler 1003 on the servers 1001
Feature managers 1004 on multiple data silos 1002
Predictors 1009 on the servers 1001

All the above components collaborate to generate models and use them for scoring, and at the same time, preserve the privacy of the data silos 1002. There are three levels of privacy that are possible in this set of inventions. The first level could preserve the data in the silos, providing privacy only for the individual data records. A second embodiment preserves that attributes of the data in the silos, preventing the model from knowing the attributes. The second embodiment may also hide the features (names of attributes) by instead returning an pseudonym for the features. In the third embodiment, the features themselves are kept hidden in the silos. For example, in the first level, that the range of the credit scores is between 575 and 829 is reported back to the modeler 1003, but the individual record is kept hidden. In the second embodiment, the modeler 1003 are told that credit scores are used, but the range is kept hidden on the data silo 1002. In the third embodiment, the credit score feature itself is kept hidden from the modeler 1003. In this third embodiment, the model itself is distributed on each data silo, and the core modeler 1003 has no knowledge of the rules used on each data silo 1002.

The collaboration between distributed components results in a set of rules generated through a rule-based induction algorithm. The DensiCube induction algorithm, in an iterative fashion, determines the data partitions based on the feature rule based on the syntactic representation (e.g., if feature F>20 and F<−25). It dichotomizes (splits) the data into partitions. Each partition is evaluated by computing statistical quality measures. Specifically, the DensiCube uses an F-Score measure to compute the predictive quality of a specific partition. In binary classification the F-score measure is a measure of a test's accuracy and is defined as the weighted harmonic mean of the test's precision and recall, Precision (also called positive predictive value) is the fraction of relevant instances among the retrieved instances, while Recall (also known as sensitivity) is the fraction of relevant instances that have been retrieved over the total amount of instances.

Specifically, the following steps are executed by Distributed DensiCube:

1) The modelers 1003 invokes feature managers 1004 that subsequently start data partitioning based on the local set of features at the data silo 1002. This process is called specialization.

2) Feature managers 1004 push their computed partitions (i.e., using the data identifier as the partition identifier) and their corresponding evaluation measures (e.g., F-score) to modelers 1003.

3) Each feature model manager 1008 compares evaluation measures of the sent partitions and selects the top N best partitions (i.e. specifically it establishes the global beam search for the top preforming partitions and their combinations).

4) Subsequently, the modeler 1003 proceeds to the process of generating partition combinations. The first iteration of such combinations syntactically represent two-conditional rules (i.e., a partition is represented by a joint of lower and upper bounds of two features). Once this process is completed the identifiers of the two-conditional rules are sent to the feature managers 1004. Once received, feature managers 1004 evaluate the new partitions identified by the identifiers by executing the next iteration specialization.

A data manager 1012 is a logical construct which is comprised of a data orchestrator 1005 and one or more feature data managers 1006, which cooperate to manage data sets. Data sets can be used to create models and/or to make predictions using models. A data orchestrator 1005 is a component which provides services to maintain Data Sets, is identified by its host domain and port, and has a name which is not necessarily unique. A feature data manager 1006 is a component which provides services to maintain Feature Data Sets 1203, is identified by its host domain and port, and has a name which is not necessarily unique. A data set lives in a data orchestrator 1005, has a unique ID within the data orchestrator 1005, consists of a junction of Feature Data Sets 1203, joins Feature Data Sets 1203 on specified unique features, and is virtual tabular data (see FIG. 12). Each column 1206, 1207 is a feature from a Feature Data Set 1203. The columns also are associated with a feature data manager 1202. Each row is a junction of Events 1204 from each Feature Data Set 1203. The join feature attribute values 1205 are the joined features attributes from each row and column. The entire junction is the table 1201.

A model manager 1013 is a logical construct which is comprised of a model orchestrator 1007 and one or more feature model managers 1008, which cooperate to generate models.

A prediction manager 1014 is a logical construct which is comprised of a prediction orchestrator 1010 and one or more feature prediction managers 1011, which cooperate to create scores and statistics (a.k.a. predictions).

1.2 Distributed Scoring

The distributed scoring process is accomplished in two steps. First, partial scores are calculated on each feature manager 1004 on each server. Then, complete scores are calculated from the partial scores.

The combined scores are the sum of the scores from each server divided by the sum of the weights from each server, multiplied by two:

$$\text{score}(e, R) = \frac{ScoreA + ScoreB}{2 \times \sum_{i=1}^{m} w_{Ri}}$$

In this formula, the score for server A and B are similar to the DensiCube scoring described above.

$$ScoreA = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

$$ScoreB = \sum_{i=1}^{m} w_{Ri}\left(\frac{|e_{Ri} - n_{Ri}| - |e_{Ri} - p_{Ri}|}{|p_{Ri} - n_{Ri}|} + 1\right)$$

The weights are also determined for each location, as above.

$$w_{Ri} = \frac{|p_{Ri} - n_{Ri}|}{\max_{Ri} - \min_{Ri}}$$

$$w_{Ri} = \frac{|p_{Ri} - n_{Ri}|}{\max_{Ri} - \min_{Ri}}$$

With the combined score, we have a metric to show the validity of the selected model.

2.0 Initial Architectural Concept of Operation and Requirements 2.1 Feature Manager 1004

At the initialization of the machine learning model generation process, each feature manager 1004 is setup on the local servers 1002. Each feature manager 1004 must be uniquely named (e.g., within the subnet where it lives). The port number where the feature manager 1004 can be reached needs to be defined. Access control needs to be configured, with a certificate for the feature manager 1004 installed and the public key for each modeler 1003 and feature prediction manager 1011 installed to allow access to this feature manager 1004. Each local feature manager 1004 needs to broadcast the name, host, port and public key of the feature manager 1004. In some embodiments, the feature manager 1004 needs to listen to other broadcasts to verify uniqueness.

Next, the data sources are defined. A seen in FIGS. 8 and 12, the data source is tabular form (Rows & Columns). In another embodiment, a Relation Data Source is a collection of Data Tables which themselves contain tabular data. The important characteristic is to be able to define a Data Set Template which results in the Column definition of tabular data. Each Data Source must be uniquely identified by name within a feature manager 1004. Each Column must be uniquely identified by name within a Data Source. At least one Column in each Data Source must be unique and suitable for joining to other Data Sources. It must have meaning outside the Data Source such that the feature model managers 1008 can join the Data Source to other Data Sources.

Each Data Source shall be described by a name for the data source and a plurality of columns, where each column has a name, a data type, and a uniqueness field. Data Sources can be used by feature model managers 1008 or feature prediction managers 1011 or both. Data Sources are probably defined by calls from a modeler 1003.

The next step involves defining the Data Set Templates. A Data Set Template is a specification of how to join Data Sources defined within a feature data manager 1006. Each Data Set Template must be uniquely identified by name within a feature data manager 1006. A Data Set Template is a definition of Columns without regard to the Rows in each Data Source. For example, a Data Set Template could be represented by a SQL select statement with columns and join conditions, but without a where clause to limit rows. Data Set Templates can be used by feature model managers 1008 or feature prediction managers 1011 or both. Data Set Templates are probably defined by calls from a feature model manager 1008.

Once the Data Set Templates are setup, the next step is to define the Data Sets. A Data Set is tabular data which is a subset of a data from the Data Sources defined within a feature data manager 1006. Each Data Set must be uniquely identified by name within a feature data manager 1006. A Data Set is defined by a Data Set Template to define the columns and a set of filters to define the rows. For example, the filter could be the where clause in a SQL statement. Data Sets can be used by modelers 1003 or feature prediction managers 1011 or both. Data Sets are probably defined by calls from a modeler 1003.

2.2 Modeler 1003

In FIG. 10 the relationship between the modelers 1003, the predictors 1009, and the feature managers 1004.

In the setup of the model orchestrator 1007, each modeler 1003 should be uniquely named, at least within the subnet where it lives. However, in some embodiments, the uniqueness may not be enforceable. Next the access control is configured by installing a certificate for the modeler 1003 and installing the public key for each feature manager 1004 containing pertinent data. The public key for each feature prediction manager 1011 is also installed, to which this modeler 1003 can publish.

Once set up, the model orchestrator 1007 establishes a connection to each feature model manager 1008.

Then the Model Data Set templates are defined. A Model Data Set Template is a conjunction of Data Set Templates from feature data managers 1006. Each Data Set Template must be uniquely named within the feature manager 1004. The Data Set Templates on feature data managers 1006 are defined, as are the join conditions. A join condition is an equality expression between unique columns on two Data Sets. For example <Feature Manager A>.<Data Set Template 1>.<Column a>==<Feature Manager B>.<Data Set Template 2>.<Column b>. Each data set participating in the model data set must be joined such that a singular virtual tabular data set is defined.

After the templates are defined, the model data sets themselves are defined. A Model Data Set is a conjunction of Data Sets from feature data managers 1006. The Model Data Set is a row filter applied to a Model Data Set Template. Each Data Set must be uniquely named within a Model Data Set Template. Then the data sets on the feature data managers 1006 are defined. This filters the rows.

Next, the Modeling Parameters are defined. Modeling Parameters define how a Model is created on any Model Data Set which is derived from a Model Data Set Template. Each Modeling Parameters definition must be unique within a Model Data Set Template.

Then, a model is created and published. A model is created by applying Modeling Parameters to a Model Data Set. Each Model must be uniquely identified by name within a Model Data Set. A Model can be published to a feature prediction manager 1011. Publishing will persist the Model artifacts in the feature model managers 1008 and feature prediction managers 1011*s*. Following are some of the artifacts which will be persisted to either the feature data manager 1008 and/or feature prediction manager 1011: Data set templates, model data set templates, and the model.

2.3 Prediction Orchestrator 1010

The prediction orchestrator 1010 setup begins with the configuration of the access control. This is done by installing a certificate for the feature prediction manager 1011 and installing the public key for each modeler 1003 allowed to access this prediction orchestrator 1010. The public key for each feature manager 1004 containing pertinent data is also installed. Each prediction orchestrator 1010 should be uniquely named, but in some embodiments this may not be enforced.

Next, a connection to each feature prediction manager 1011 is established and to a model orchestrator 1007. The model orchestrator 10007 will publish the Model Data Set Template and Model to the prediction orchestrator 1010.

The scoring data sets are then defined. A Scoring Data Set is a conjunction of Data Sets from the feature data managers 1006. It is a row filter applied to a Model Data Set Template. Each Data Set must be uniquely named within a Model Data Set Template. The data sets on the feature data managers 1006 are defined (this filters the rows).

Then the Scoring Parameters are defined. Scoring Parameters define how Scores are calculated on any Score Data Set which is derived from a Model Data Set Template. Each Scoring Parameters definition must be unique within a Model Data Set Template.

Finally, a Scoring Data Set is defined. Partial Scores are calculated on each feature manager 1004 in the feature prediction manager 1011. See FIG. 11A. Complete Scores are then calculated by the prediction orchestrator 1010 from the partial Scores. See FIG. 11B for the calculation combining the partial scores.

Figure 13:
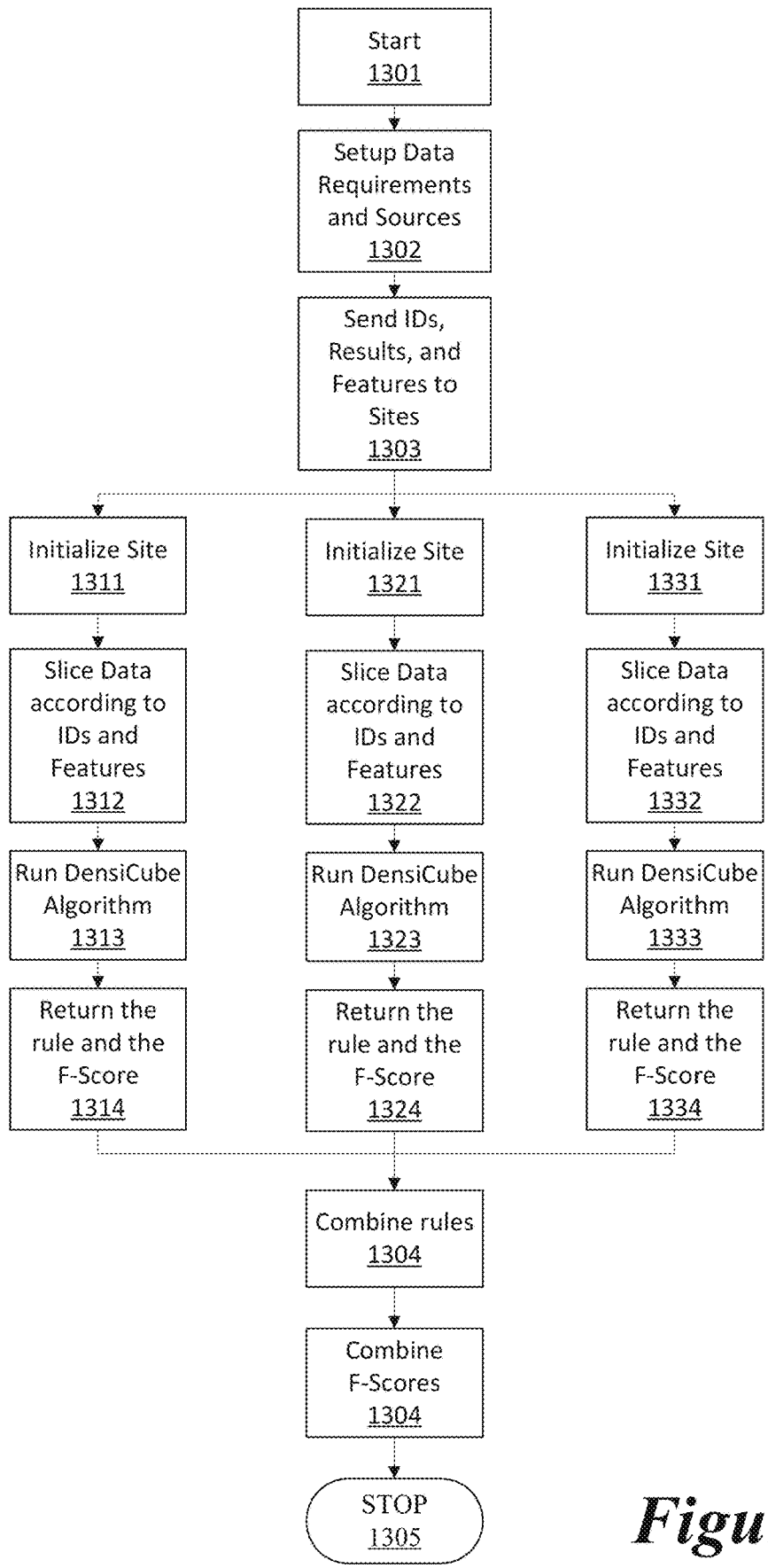
FIG. 13 is a flowchart showing the distributed nature of the Distributed DensiCube algorithm.

Looking to FIG. 13, we see the distributed nature of the Distributed DensiCube algorithm. The algorithm starts 1301 by initializing the software. The data requirements are setup, and the distributed sources of the data are identified 1302. Once the data features have been identified, a list of the IDs 801, the learning results (e.g. the Loan Results in 802), and the perhaps the desired features (e.g. Amount Borrowed n 802, Credit Score and Total Debt in 803, Home Ownership and Home Value in 804) are sent 1303 to the data silos 1002. In some embodiments, the desired features are not sent, instead, the feature manager 1004 on the data silo 1002 determines the features. While the FIG. 8 embodiment has a tri-state results (+, −, and blank), some embodiments only use a two state results set ("+" or blank). In the two state embodiment, there is no need to transmit the learning results; instead only a list of IDs is sent, with the implication that the IDs specified are the set of positive results.

The feature managers 1004 on each of the data silos 1002 then initialize the site 1311, 1321, 1331. The data on the silo 1002 is then sliced, using the list of IDs and the features 1312, 1322, 1332 into a data set of interest, by the feature data manager 1006. The DensiCube algorithm 1313, 1323, 1333 is then run by the feature model manager 1008 on the data of interest, as seen in FIGS. 2, 3, and 4. Once the DensiCube algorithm 1313, 1323, 1333 is complete, the rule and the F-score are finalized by the feature prediction managers 1011, the rule and F-Scores are returned 1314, 1324, 1334 to the prediction orchestrator 1010. In some embodiments, only the F-Scores are returned 1314, 1324, 1334, and the rules are maintained locally in the feature managers 1004.

Figure 11A:
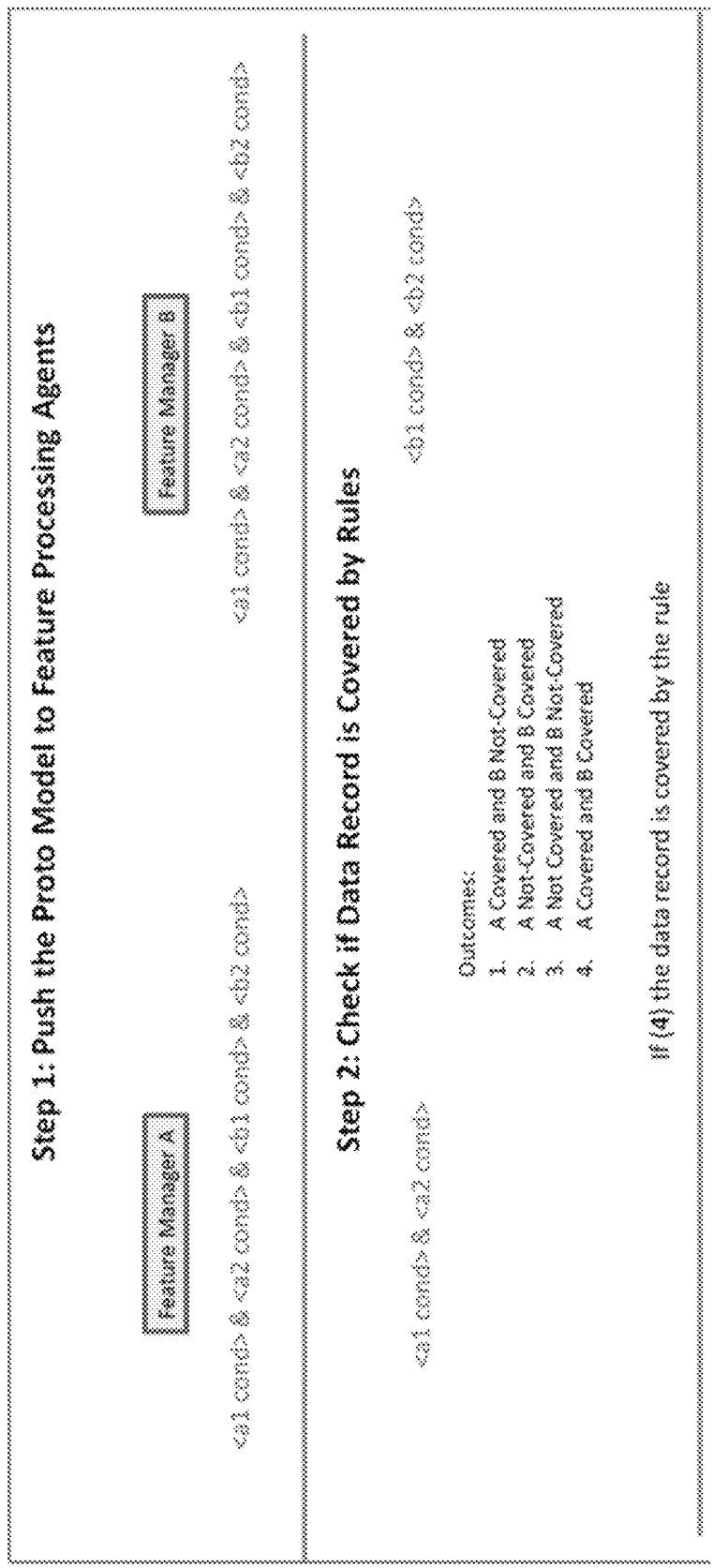
FIGS. 11A and 11B show modifications to the scoring algorithm to support privacy preserving in the data silos.
Figure 11B:
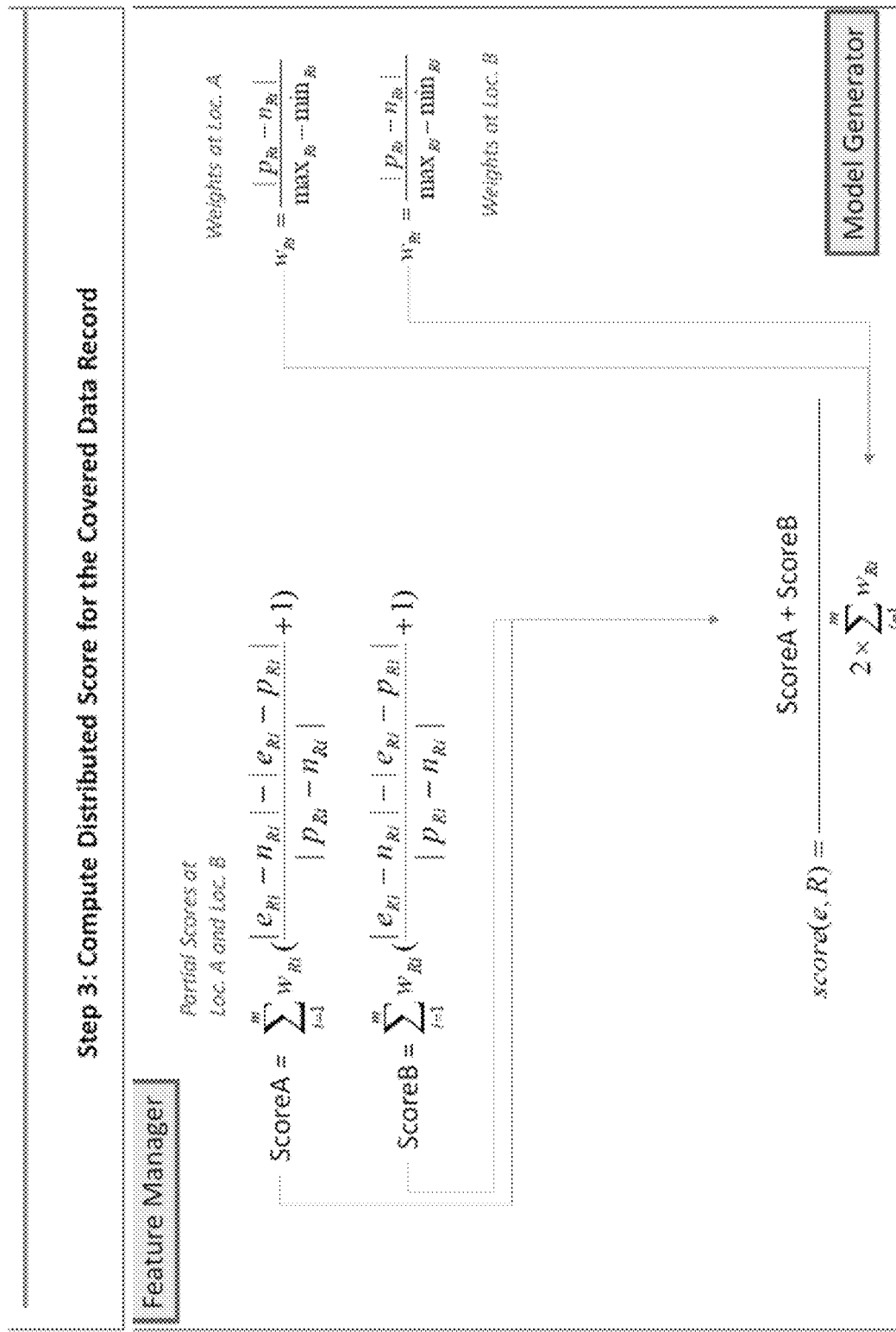

The rules, in some embodiments, are then returned to the prediction orchestrator 1010 where they are combined into an overall rule 1304, as seen in FIG. 11A. Next, the F-Scores are combined 1304 by the prediction orchestrator 1010 into an overall F-Score for the generated rule using the formulas in FIG. 11B. And the Distributed DensiCube algorithm is complete 1305.

Modifications to the scoring algorithms to support privacy preserving in the data silos.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A distributed method for creating a machine learning rule set, the method comprising:
   preparing, on a computer, a set of data identifiers to identify data elements representing similar events for training the machine learning rule set;
   sending the set of data identifiers to a plurality of data silos;
   executing, on each data silo, a machine learning algorithm using the data elements and the data identifiers on the data silo to derive a silo specific rule set;
   calculating, on each data silo, a quality control metric on the silo specific rule set;
   sending the quality control metric from each data silo to the computer; and
   combining, on the computer, the quality control metrics from each data silo into a combined quality control metric.

2. The method of claim 1 wherein the quality control metric is an F-Score.

3. The method of claim 1 wherein the combined quality control metric uses a weighted algorithm.

4. The method of claim 1 wherein at least one of the plurality of data silos comprise a special purpose processor and a special purpose storage facility.

5. The method of claim 1 further comprising sending the silo specific rule sets to the computer from at least one of the plurality of data silos.

6. The method of claim 5 further comprising sending a plurality of silo specific rule sets and quality control metrics associated with the silo specific rule sets, from at least one of the plurality of data silos to the computer.

7. The method of claim 1 wherein the silo specific rule sets are not returned to the computer.

8. The method of claim 1 wherein a set of training results are sent with the data identifiers to the plurality of data silos from the computer.

9. The method of claim 1 wherein the machine learning algorithm creates a test rule by adding a condition, calculating a test quality metric, and saving the test rule and the test quality metric if the quality metric is better than previously saved test quality metrics.

10. The method of claim 9 wherein the condition is a range locating clusters of data.

11. A distributed method for creating a machine learning rule set, the method comprising:
preparing, on a computer, a set of data identifiers to identify data elements representing similar events for training the machine learning rule set;
sending the set of data identifiers to a plurality of data silos;
a means for executing, on each data silo, a machine learning algorithm using the data elements and the data identifiers on the data silo to derive a silo specific rule set;
a means for calculating, on each data silo, a quality control metric on the silo specific rule set;
sending the quality control metric from each data silo to the computer; and
a means combining, on the computer, the quality control metrics from each data silo into a combined quality control metric.

12. A distributed system for creating a machine learning rule set, the system comprising:
a computer that executes software to prepare a set of data identifiers to identify data elements in a plurality of data silos;
a network connected to the computer;
the plurality of data silos, in communication with the computer through the network, wherein the plurality of data silos each independently execute machine learning software to create a silo specific rule set based on the data identifiers and silo specific data elements, and further calculating silo specific quality control metrics for the silo specific rule set;
wherein the plurality of data silos transmit, through the network to the computer, the silo specific quality control metrics; and
wherein the computer executes software to combine the quality control metrics from each data silo into a combined quality control metric.

13. The system of claim 12 wherein the quality control metric is an F-Score.

14. The system of claim 12 wherein the combined quality control metric uses a weighted algorithm.

15. The system of claim 12 wherein each data silo comprises a special purpose processor and a special purpose storage facility.

16. The system of claim 12 wherein the silo specific rule sets are returned to the computer and combined into the machine learning rule set.

17. The system of claim 16 wherein a plurality of silo specific rule sets and quality control metrics associated with the silo specific rule sets are returned to the computer from each data silo.

18. The system of claim 12 wherein the silo specific rule sets are not returned to the computer.

19. The system of claim 12 wherein an associated set of training results are sent with the identifiers to the plurality of data silos from the computer.

20. The system of claim 12 wherein a machine learning algorithm creates a test rule by adding a condition, calculating a test quality metric, and saving the test rule and the test quality metric if the quality metric is better than previously saved test quality metrics.

\* \* \* \* \*